(12) United States Patent
Crezee

(10) Patent No.: US 10,765,106 B2
(45) Date of Patent: Sep. 8, 2020

(54) TRAP FOR CATCHING ANIMALS, IN PARTICULAR MICE OR RATS

(71) Applicant: Hendrik Maarten Crezee, Werkendam (NL)

(72) Inventor: Hendrik Maarten Crezee, Werkendam (NL)

( * ) Notice: Subject to any disclaimer, the term of this patent is extended or adjusted under 35 U.S.C. 154(b) by 204 days.

(21) Appl. No.: 15/842,009

(22) Filed: Dec. 14, 2017

(65) Prior Publication Data

US 2018/0271083 A1     Sep. 27, 2018

(30) Foreign Application Priority Data

Mar. 24, 2017   (NL) ...................................... 2018579

(51) Int. Cl.
*A01M 23/30*     (2006.01)
*A01M 23/00*     (2006.01)
*A01M 31/00*     (2006.01)

(52) U.S. Cl.
CPC .......... *A01M 31/002* (2013.01); *A01M 23/00* (2013.01); *A01M 23/30* (2013.01)

(58) Field of Classification Search
CPC ....... A01M 23/30; A01M 23/00; A01M 23/24
USPC ................................................. 43/81, 58, 88
See application file for complete search history.

(56) References Cited

U.S. PATENT DOCUMENTS

| | | | | |
|---|---|---|---|---|
| 4,517,557 A * | 5/1985 | Agron | ................... | A01M 23/30 340/540 |
| 4,711,049 A * | 12/1987 | Kness | ................... | A01M 23/30 43/81 |
| 4,719,718 A * | 1/1988 | Kon | ................... | A01M 23/30 43/81 |
| 4,907,366 A * | 3/1990 | Balfour | ................ | A01M 1/023 43/114 |
| 5,154,017 A * | 10/1992 | Disalvo | ................ | A01M 23/30 43/81 |
| 5,184,416 A * | 2/1993 | Brewer | ................ | A01M 23/30 43/81 |
| 5,477,635 A * | 12/1995 | Orsano | ................ | A01M 23/30 43/81 |

(Continued)

FOREIGN PATENT DOCUMENTS

| | | | | |
|---|---|---|---|---|
| CA | 2992645 A1 * | 1/2017 | ............. | H04W 4/00 |
| DE | 29802012 U1 * | 6/1998 | ........... | A01M 23/24 |

(Continued)

*Primary Examiner* — Darren W Ark
(74) *Attorney, Agent, or Firm* — Patshegen IP LLC; Moshe Pinchas

(57) ABSTRACT

A trap 1 has a frame 3, a striking bar 5 connected to the frame for killing a mouse or rat and a retaining bracket 7 attached to the striking bar, which is blocked in standby position by a blocking pawl 11 which can be released by an activating element 13. A spring 9 is present between the striking bar and the frame, which striking bar hits the frame after activation. The trap is provided with a first sensor 17 which determines whether the striking bar is present in the standby or activated position, and a second sensor 19 which determines whether a mouse is present between the frame and the striking bar or not. The trap can determine three situations with the two sensors: standby, tripped and tripped with a mouse in the trap. This allows the status of the trap to be properly monitored.

6 Claims, 3 Drawing Sheets

(56) References Cited

U.S. PATENT DOCUMENTS

| | | | | |
|---|---|---|---|---|
| 5,528,853 | A * | 6/1996 | Dufaux | A01M 23/30 43/81 |
| 6,137,415 | A * | 10/2000 | Rast | A01M 23/245 340/384.1 |
| 6,508,031 | B1 * | 1/2003 | Johnson | A01M 23/30 43/83.5 |
| 6,775,946 | B2 * | 8/2004 | Wright | A01M 21/00 43/58 |
| 7,656,300 | B2 * | 2/2010 | Ronnau | A01M 1/026 340/506 |
| 7,757,429 | B1 * | 7/2010 | Cambio | A01M 23/30 43/81 |
| 7,954,275 | B2 * | 6/2011 | Frisch | A01M 23/30 43/114 |
| 8,026,822 | B2 * | 9/2011 | Borth | A01M 1/026 340/573.2 |
| 8,156,683 | B2 * | 4/2012 | Slotnick | A01M 31/002 43/81 |
| 8,181,383 | B2 * | 5/2012 | Huang | A01M 23/26 43/81 |
| 8,291,637 | B2 * | 10/2012 | Patterson | A01M 31/002 43/81 |
| 8,490,322 | B2 * | 7/2013 | Dobias | A01M 23/30 43/81 |
| 8,635,806 | B2 * | 1/2014 | Gardner, Jr. | A01M 1/026 43/107 |
| 8,830,071 | B2 * | 9/2014 | Borth | A01M 1/026 340/573.2 |
| 8,933,812 | B2 * | 1/2015 | Clifford | A01M 31/002 340/384.2 |
| 9,258,990 | B1 * | 2/2016 | Harvey | A01M 23/265 |
| 9,542,835 | B2 * | 1/2017 | Borth | A01M 1/026 |
| 10,085,133 | B2 * | 9/2018 | Borth | A01M 1/026 |
| 10,440,944 | B2 * | 10/2019 | LaRoque | A01M 31/002 |
| 10,455,828 | B2 * | 10/2019 | Jensen | A01M 23/24 |
| 10,477,854 | B1 * | 11/2019 | Yang | A01M 23/245 |
| 2004/0020100 | A1 * | 2/2004 | O'Brien | A01M 23/18 43/1 |
| 2006/0272197 | A1 * | 12/2006 | Wiesener | A01M 23/245 43/81 |
| 2008/0204253 | A1 * | 8/2008 | Cottee | A01M 23/245 340/573.2 |
| 2009/0151221 | A1 * | 6/2009 | Daley | A01M 23/245 43/58 |
| 2011/0047859 | A1 * | 3/2011 | Mendez | A01M 23/30 43/81 |
| 2011/0072709 | A1 * | 3/2011 | Patterson | A01M 23/30 43/81 |
| 2013/0342344 | A1 * | 12/2013 | Kramer | A01M 23/00 340/539.1 |
| 2018/0199565 | A1 * | 7/2018 | Zosimadis | H04W 4/00 |
| 2018/0235205 | A1 * | 8/2018 | Howard | A01M 23/30 |
| 2018/0249698 | A1 * | 9/2018 | Jensen | G08B 21/18 |
| 2018/0317476 | A1 * | 11/2018 | Jones | A01M 31/002 |
| 2019/0037829 | A1 * | 2/2019 | Laut | A01M 31/002 |
| 2020/0029550 | A1 * | 1/2020 | Koziar, Jr. | H01Q 1/38 |

FOREIGN PATENT DOCUMENTS

| | | | |
|---|---|---|---|
| DE | 202015101593 U1 * | 4/2015 | |
| EP | 3351099 A1 * | 7/2018 | A01M 23/16 |
| WO | WO-0150430 A1 * | 7/2001 | A01M 23/24 |
| WO | WO-2007026123 A1 * | 3/2007 | A01M 23/245 |
| WO | WO-2010030346 A1 * | 3/2010 | A01M 1/026 |
| WO | WO-2015052694 A1 * | 4/2015 | |
| WO | WO-2016037179 A1 * | 3/2016 | A01M 23/005 |
| WO | WO-2017036480 A1 * | 3/2017 | G08B 21/18 |
| WO | WO-2017149163 A1 * | 9/2017 | A01M 23/26 |
| WO | WO-2018128799 A1 * | 7/2018 | B01F 7/00033 |
| WO | WO-2019040648 A1 * | 2/2019 | A01M 23/30 |

* cited by examiner

TRAP FOR CATCHING ANIMALS, IN PARTICULAR MICE OR RATS

TECHNICAL FILED OF THE INVENTION

The invention relates to a trap for catching animals, in particular mice or rats, comprising:
- a frame,
- a catching element for catching an animal,
- a spring which is present between the frame and the catching element and exerts a force on the catching element, which spring is tensioned when the catching element is in a standby position in which it is ready to catch the animal, and is partly relaxed if the catching element is present in an activated position in which the animal could be caught,
- a blocking pawl which is movable between a blocking position in which it holds the catching element in standby position and a release position in which it has released the catching element,
- an activation element which is movably connected to the frame and when activated brings the blocking pawl from the blocking position to the release position,
- a first sensor which determines whether the catching element is present in the standby or activated position, and
- a second sensor which determines whether an animal is caught or not.

BACKGROUND OF THE INVENTION

Such a trap is known from WO 2010/030346 A1. In this known trap, the second sensor is a pressure sensor that is to determine the presence of an animal. It must be prevented that this second sensor is activated while no animal is present or not activated while an animal is present in the trap. The known trap does not offer a satisfactory solution here.

SUMMARY OF THE INVENTION

An object of the invention is to provide a trap of the type described in the opening paragraph in which it is ensured that the second sensor always indicates the correct state. To this end, a trap according to the invention is characterized in that the second sensor is present between the frame and the activating element and delivers a signal in the presence of an animal between the catching element and the activating element, wherein the catching element presses the animal onto the activating element and thereby moves the activating element such that it activates the second sensor. Only in the presence of an animal will the catching element, indirectly via the caught animal, press the activating element against the second sensor.

The trap according to the invention can determine three situations with the two sensors, namely standby (tensioned), activated (relaxed) and activated (relaxed) with an animal in the trap. This allows the situation to be properly monitored.

An embodiment of the trap according to the invention is characterized in that in the absence of an animal between the catching element and the activating element, the catching element presses against the activating element and against a spacer cam present on the frame, in which position the activating element does not activate the second sensor.

An embodiment of the trap according to the invention, which is eminently suitable for catching mice, is characterized in that:

the catching element is a striking bar for killing the animal, which striking bar is rotatably connected to the frame and is displaceable between a standby position, in which the striking bar is able to strike against the frame, and a activated position, in which the striking bar is struck against the frame or the animal, the spring is present between the frame and the striking bar and is tensioned if the striking bar is in the standby position and is less tensioned if the striking bar is in the activated position, the blocking pawl is displaceable between the blocking position in which it holds the striking bar in the standby position and the release position in which it has released the striking bar, the activating element is rotatably connected to the frame and when activated brings the blocking pawl from the blocking position to the release position, and the trap further comprises a food container for holding food for the animal to be caught, wherein the first sensor determines whether the striking bar is present in the standby or activated position, and the second sensor determines whether or not an animal is present between the frame and the striking bar.

Preferably, the striking bar is U-shaped and with the ends of the legs of the U-shape is rotatably connected to the frame, and the activation element is formed by a plate which is present between the striking bar and the frame in the activated position of the striking bar.

A favorable embodiment of the trap according to the invention is characterized in that the trap comprises a retaining bracket which is fastened to the striking bar and is blocked in the standby position by the blocking pawl, wherein the first sensor between the frame the retaining bracket is present in the standby position of the striking bar. After the spring is springing, the striking bar will move and the retaining bracket attached to it will move away from the first sensor so that the correct status is always observed by this sensor.

Preferably, the sensors are pressure sensors which are either in a depressed position or in an unpressed position, the first sensor being moved by the activating element is pressed if an animal is caught and the second sensor is depressed by the retaining bracket in the standby position of the striking bar.

Yet another embodiment of the mouse trap according to the invention is characterized in that the trap comprises a transmitter which periodically sends the status of the sensors.

BRIEF DESCRIPTION OF THE DRAWINGS

The invention will be further elucidated below on the basis of drawings. These drawings show an embodiment of the trap according to the present invention. In the drawings.

DETAILED DESCRIPTION OF THE DRAWINGS

Figure 1:
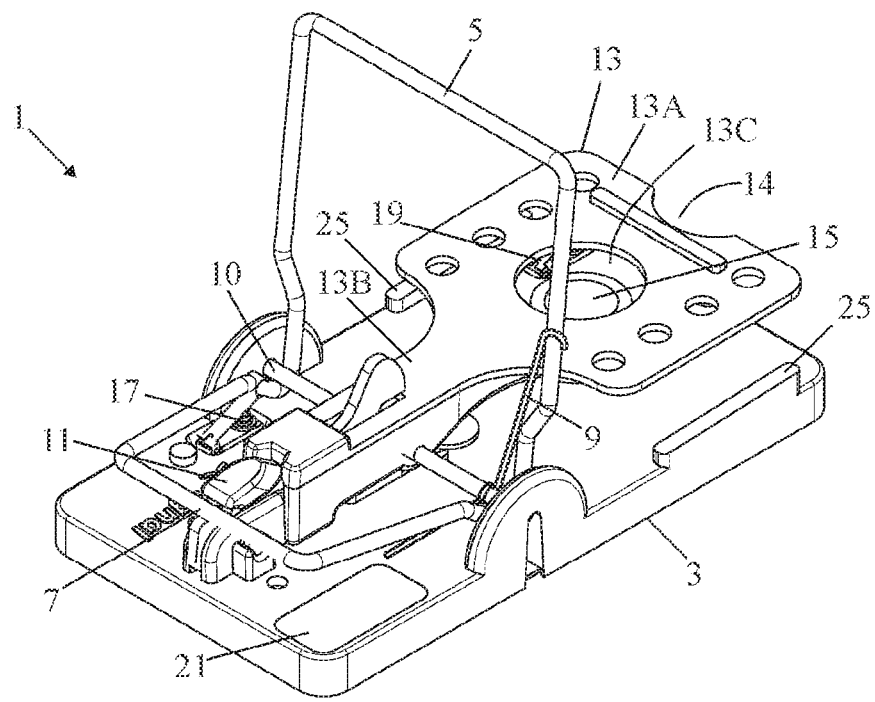
FIG. 1 shows an embodiment of the trap according to the invention perspective with the catching element in standby position.
Figure 2:
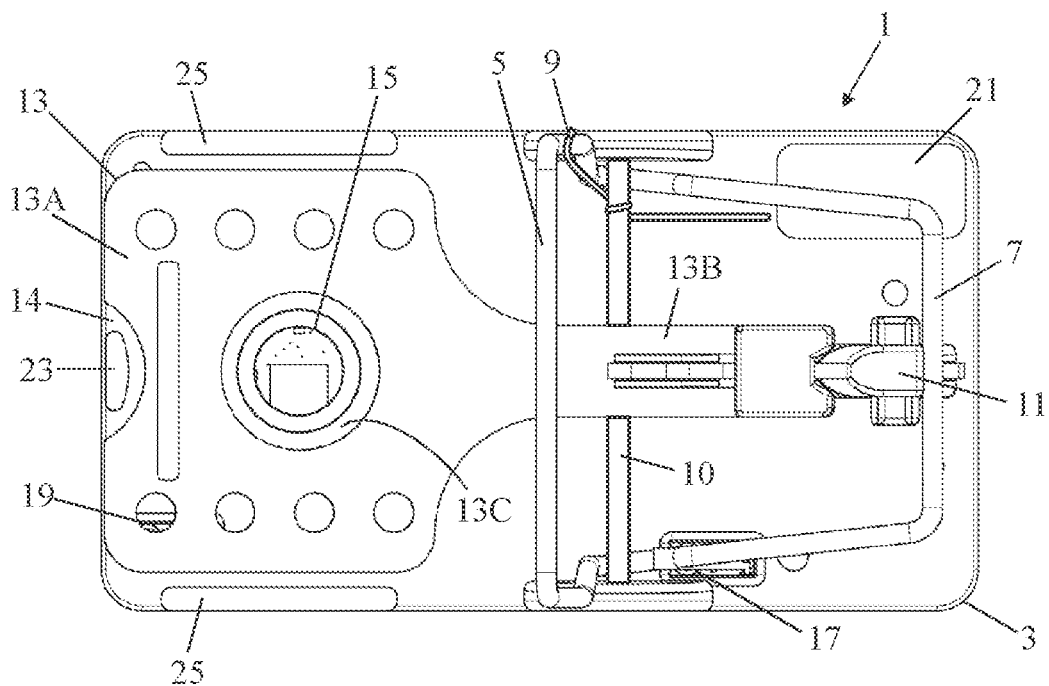
FIG. 2 shows the trap represented in FIG. 1 in top view.
Figure 3:
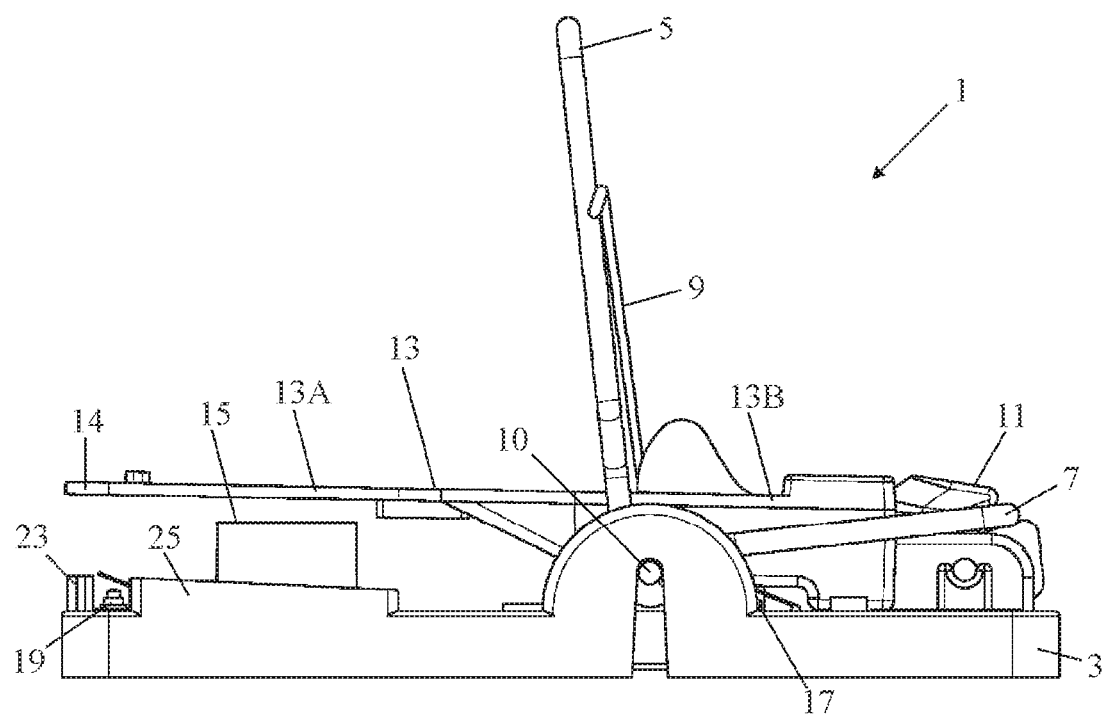
FIG. 3 is a side view of the trap shown in FIG. 1.

FIGS. 1-3 show an embodiment of the trap according to the invention with the catching element in standby position in perspective, top view and side view, respectively. The trap 1 has a frame 3 and a striking bar 5 rotatably connected thereto for killing a mouse or rat. The striking bar is movable between a standby position in which a tensioned spring 9 exerts a force on the striking bar and the striking bar is ready to strike against the frame, and an activated position in which the spring is partially relaxed and the striking bar is struck against the frame or the mouse or rat. The spring 9 is a wire spring which is wrapped around an axis 10 and one end of which is supported against the frame and the other end presses against the striking bar.

Attached to the striking bar is a retaining bracket 7, which in the standby state of the striking bar is held by a blocking pawl 11. This blocking pawl can be brought to a release position by an activating element 13 which is rotatably connected to the frame. This activating element 13 is formed by a plate 13A with an arm 13B attached to it of which arm a free end moves the blocking pawl 11 when a mouse or rat pushes the plate downwards to access the food. The activating element 13 is rotatable about the same axis 10 as the striking bar with a retaining bracket can be rotated.

A food container 15 is provided on the frame 3 for holding food for the mouse or rat. This food container protrudes through a hole 13C present in the plate of the activating element 13.

The trap further has two sensors 17 and 19, a first sensor 17 of which determines whether the striking bar 5 is present in the standby or activated position and a second sensor 19 determines whether a mouse or rat is present between the frame 3 and the striking bar 5. The first sensor 17 is present between the frame 3 and the retaining bracket 7 and the second sensor 19 is present between the frame 3 and the activating element 13. The sensors are pressure sensors that are either in a depressed position or in an unpressed position. The second sensor 19 is depressed by the activating element 13 in case a mouse or rat is present between the frame and the striking bar and the first sensor 17 is pressed by the retaining bracket 7 in the standby state of the striking bar 5. The trap further has a transmitter 21 which periodically sends the status of the sensors.

Three spacer cams 23 and 25 are present on the frame against which the striking bar 5, after release, collapses if no mouse or rat is caught. The plate 13A of the activating element 13 is narrower than the distance between the spacer cams 25 near the sides of the frame. At the location of the spacer cam 23, the plate 13A is provided with a recess 14, so that the rotation of the activating element 13 is not limited by the spacer cams 23 and 25.

Figure 4:
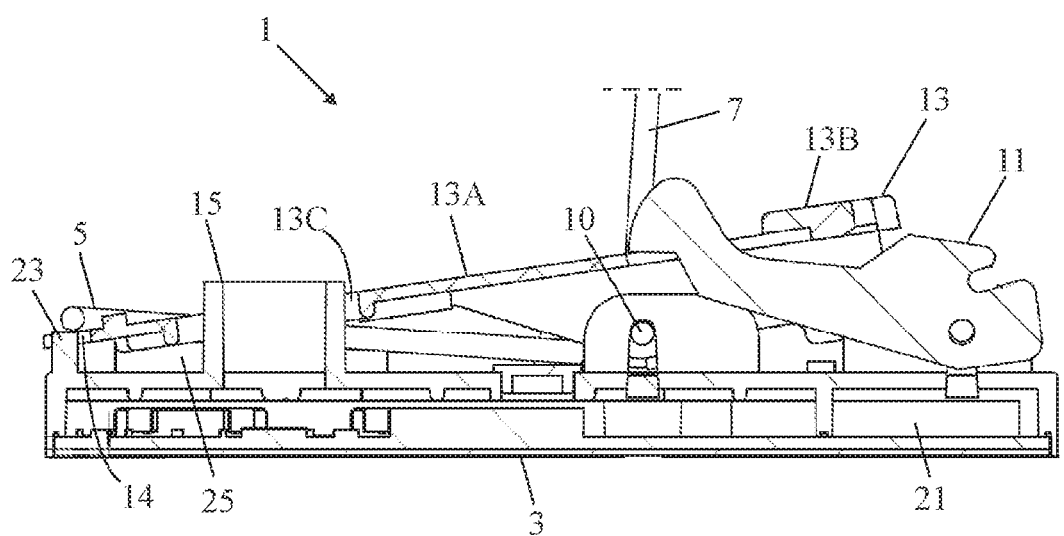
FIG. 4 shows the trap in a tripped state in a longitudinal section through the center of the trap.
Figure 5:
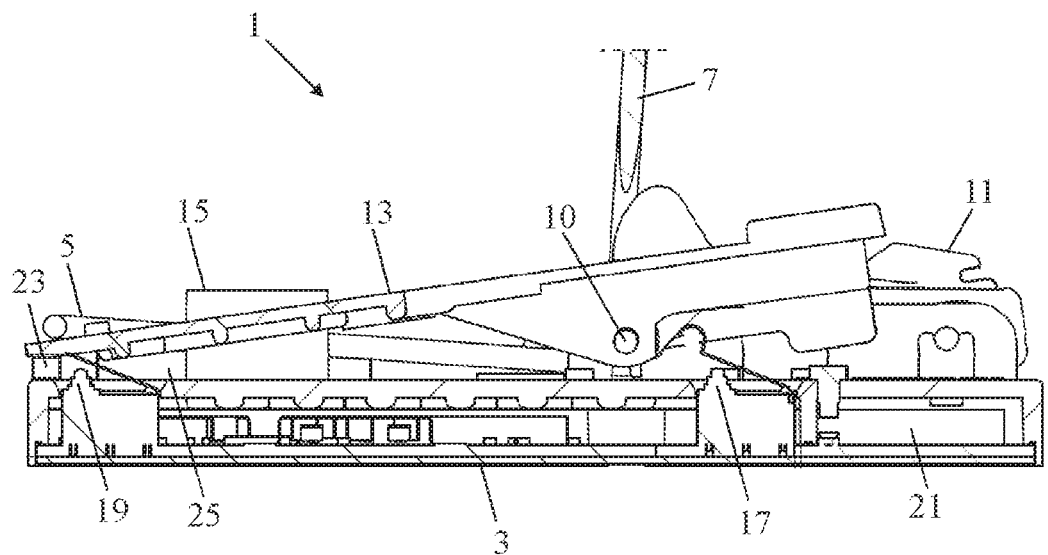
FIG. 5 shows the trap in the tripped state in a longitudinal section at the location of the sensors.

In FIGS. 4 and 5, the trap is shown in a tripped state in a longitudinal section through the center of the trap and in a longitudinal section at the location of the sensors 17 and 19, respectively. The striking bar 5 is struck against the spacer cams 23 and 25, and thereby has turned the activating element. The activating element 13 thereby does not press against the sensor 19, so that the trap gives a signal for being in a tripped state without a mouse or rat caught.

Figure 6:
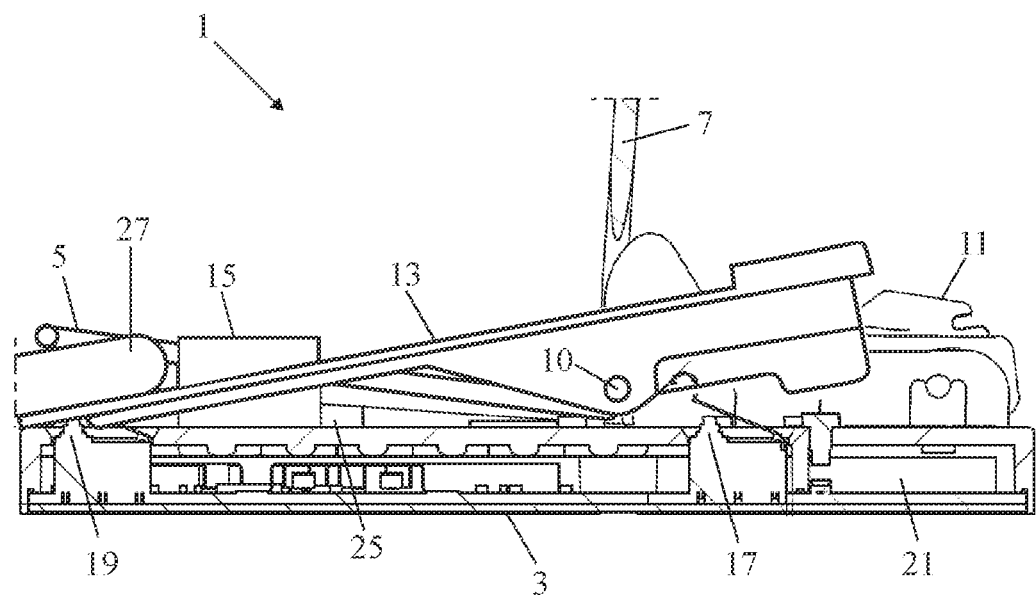
FIG. 6 shows the trap in the tripped state in a longitudinal section at the location of the sensors with a mouse in the trap.

FIG. 6 shows the trap in a tripped state with a mouse or rat caught in the trap. The mouse or rat 27 is shown schematically. The striking bar 5 presses against the caught mouse or rat 27 which turns the activating element 13 against the second sensor 19, so that the trap releases a signal for being in a tripped state with a mouse or rat caught.

Although the present invention is elucidated above on the basis of the given drawings, it should be noted that this invention is not limited whatsoever to the embodiments shown in the drawings. The invention also extends to all embodiments deviating from the embodiments shown in the drawings within the context defined by the claims.

The invention claimed is:

1. A trap for catching animals, in particular mice or rats, comprising:
   a frame,
   a catching element for catching an animal,
   a spring which is present between the frame and the catching element and exerts a force on the catching element, said spring is tensioned when the catching element is in a standby position in which it is ready to catch the animal, and is partly relaxed if the catching element is present in an activated position in which the animal could be caught,
   a blocking pawl which is movable between a blocking position in which it holds the catching element in the standby position and a release position in which it has released the catching element,
   an activating element which is movably connected to the frame and when activated brings the blocking pawl from the blocking position to the release position,
   a first sensor which determines whether the catching element is present in the standby or activated position, and
   a second sensor which determines whether the animal is caught or not, said second sensor being present between the frame and the activating element and delivers a signal in the presence of the animal between the catching element and the activating element,
   wherein the catching element presses the animal onto the activating element and thereby moves the activating element such that it activates the second sensor, and wherein in the absence of the animal between the catching element and the activating element, the catching element presses against a spacer cam present on the frame, in which position the activating element does not activate the second sensor.

2. A trap according to claim 1, characterized in that:
   the catching element is a striking bar for killing the animal, said striking bar is rotatably connected to the frame and is displaceable between the standby position, in which the striking bar is able to strike against the frame, and the activated position, in which the striking bar is struck against the frame or the animal,
   the spring is present between the frame and the striking bar and is tensioned if the striking bar is in the standby position and is less tensioned if the striking bar is in the activated position,
   the blocking pawl is displaceable between the blocking position in which it holds the striking bar in the standby position and the release position in which it has released the striking bar,
   the activating element is rotatably connected to the frame and when activated brings the blocking pawl from the blocking position to the release position, and
   the trap further comprises a food container for holding food for the animal to be caught, wherein
   the first sensor determines whether the striking bar is present in the standby or activated position, and
   the second sensor determines whether or not the animal is present between the frame and the striking bar.

3. A trap according to claim 2, characterized in that the striking bar is U-shaped with ends of legs of the U-shape being rotatably connected to the frame, and the activating element is formed by a plate which is present between the striking bar and the frame in the activated position of the striking bar.

4. A trap as claimed in claim 2, characterized in that the trap comprises a retaining bracket which is fastened to the striking bar and is blocked in the standby position by the blocking pawl, wherein the first sensor is present between the frame and the retaining bracket in the standby position of the striking bar.

5. A trap according to claim 2, characterized in that the sensors are pressure sensors which are either in a depressed position or in an unpressed position, the second sensor being moved by the activating element being pressed if an animal is caught and the first sensor is depressed by the retaining bracket in the standby position of the striking bar.

6. A trap according to claim 1, characterized in that the trap comprises a transmitter which periodically sends signals corresponding to the signals delivered by the sensors.

\* \* \* \* \*